(12) United States Patent
Diegel

(10) Patent No.: US 8,506,086 B2
(45) Date of Patent: Aug. 13, 2013

(54) DEVICE AND METHOD FOR THE REPRESENTATION OF BODY COLOURS

(76) Inventor: Marco Diegel, Jena (DE)

( * ) Notice: Subject to any disclaimer, the term of this patent is extended or adjusted under 35 U.S.C. 154(b) by 986 days.

(21) Appl. No.: 11/887,294

(22) PCT Filed: Mar. 28, 2006

(86) PCT No.: PCT/EP2006/002798
§ 371 (c)(1),
(2), (4) Date: Nov. 30, 2009

(87) PCT Pub. No.: WO2006/103042
PCT Pub. Date: Oct. 5, 2006

(65) Prior Publication Data
US 2010/0296111 A1 Nov. 25, 2010

(30) Foreign Application Priority Data
Mar. 29, 2005 (DE) .......................... 10 2005 014 152

(51) Int. Cl.
| G03B 21/14 | (2006.01) |
| G03B 21/26 | (2006.01) |
| G09G 3/34 | (2006.01) |
| G09G 5/02 | (2006.01) |
| H04N 1/46 | (2006.01) |
| G02B 5/30 | (2006.01) |
| G02B 27/28 | (2006.01) |

(52) U.S. Cl.
USPC ................. 353/20; 353/84; 353/94; 353/97; 353/121; 345/590; 345/84; 358/500; 358/1.9; 358/3.2; 359/491.01; 359/568

(58) Field of Classification Search
USPC ................. 353/20, 84, 94, 97, 121; 345/590, 345/84; 358/500, 1.9, 3.2; 359/487.03, 491.01, 359/568
See application file for complete search history.

(56) References Cited

U.S. PATENT DOCUMENTS

| 3,215,030 A | 11/1965 | Jordan ........................ 359/634 |
| 5,329,388 A | 7/1994 | Yoshimizu ..................... 349/80 |
| 5,594,563 A | 1/1997 | Larson ........................... 349/74 |
| 6,157,735 A | 12/2000 | Holub ........................... 382/167 |
| 6,607,136 B1 * | 8/2003 | Atsmon et al. ................. 235/492 |
| 6,738,155 B1 | 5/2004 | Rosenlund et al. .......... 358/1.15 |
| 2001/0014174 A1 | 8/2001 | Yamamoto .................... 382/167 |

(Continued)

FOREIGN PATENT DOCUMENTS

| JP | 07-301910 | 11/1995 |
| WO | WO 01/95544 | 12/2001 |

(Continued)

OTHER PUBLICATIONS

International Preliminary Report on Patentability (Chapter I of the Patent Cooperation Treaty).

*Primary Examiner* — Georgia Y Epps
*Assistant Examiner* — Magda Cruz
(74) *Attorney, Agent, or Firm* — Gerald T. Bodner

(57) ABSTRACT

The invention relates to a device for representing surface colors for simulating print results through a screen, comprising at least one light source and a projection surface. According to the invention the base colors are generated from white light through filters from surface colors and the mixed colors are generated through subtractive color mixing, preferably through reflexive color filters. Through the method for representing surface colors for simulating print results the capability is created to represent surface colors at different locations and at different times identically.

29 Claims, 10 Drawing Sheets

(56) References Cited

U.S. PATENT DOCUMENTS

Figure 1:
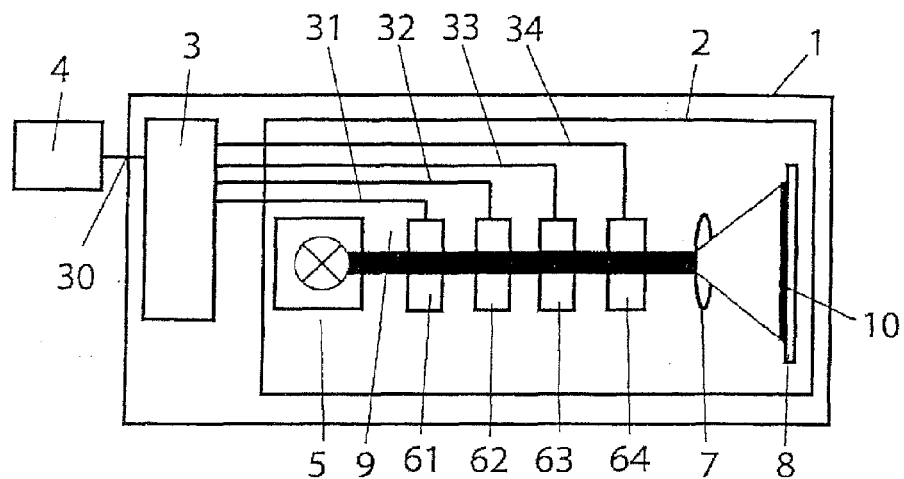

| | | | |
|---|---|---|---|
| 2002/0149546 A1* | 10/2002 | Ben-Chorin et al. | 345/32 |
| 2004/0184005 A1 | 9/2004 | Roth | 353/20 |
| 2005/0043848 A1 | 2/2005 | Wiechers | 700/115 |

FOREIGN PATENT DOCUMENTS

| | | |
|---|---|---|
| WO | WO 02/50763 | 6/2002 |
| WO | WO 03/010745 | 2/2003 |
| WO | WO 03/058587 | 7/2003 |

* cited by examiner

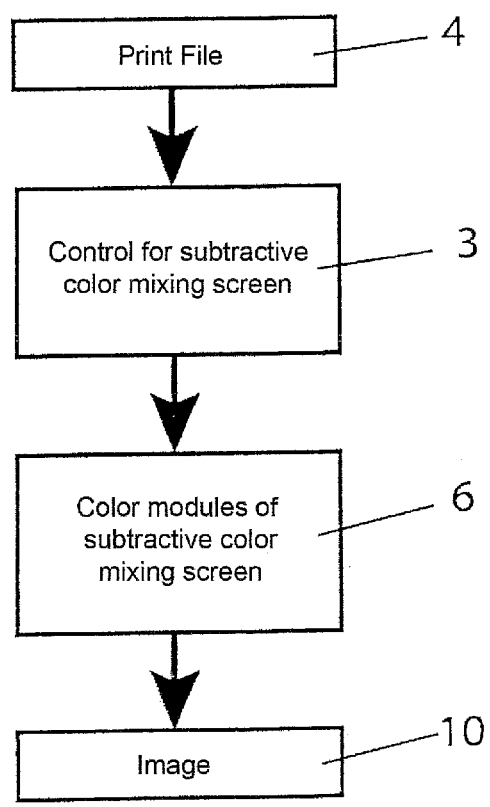

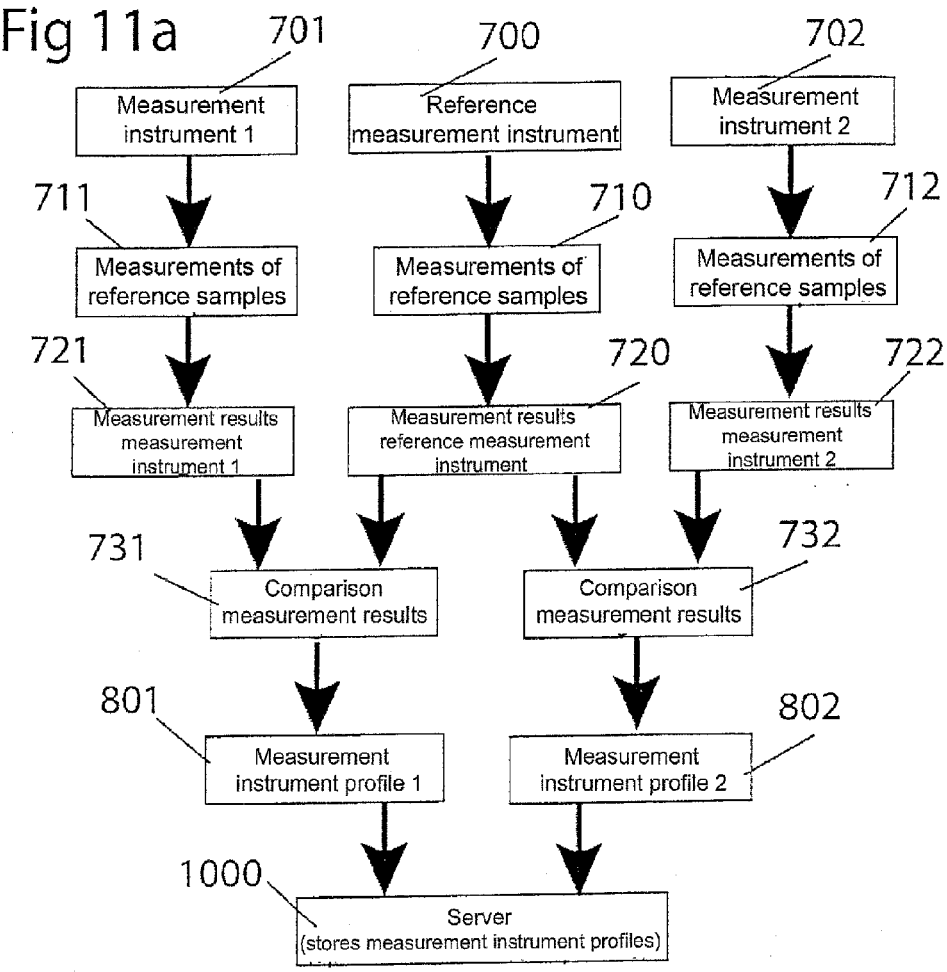

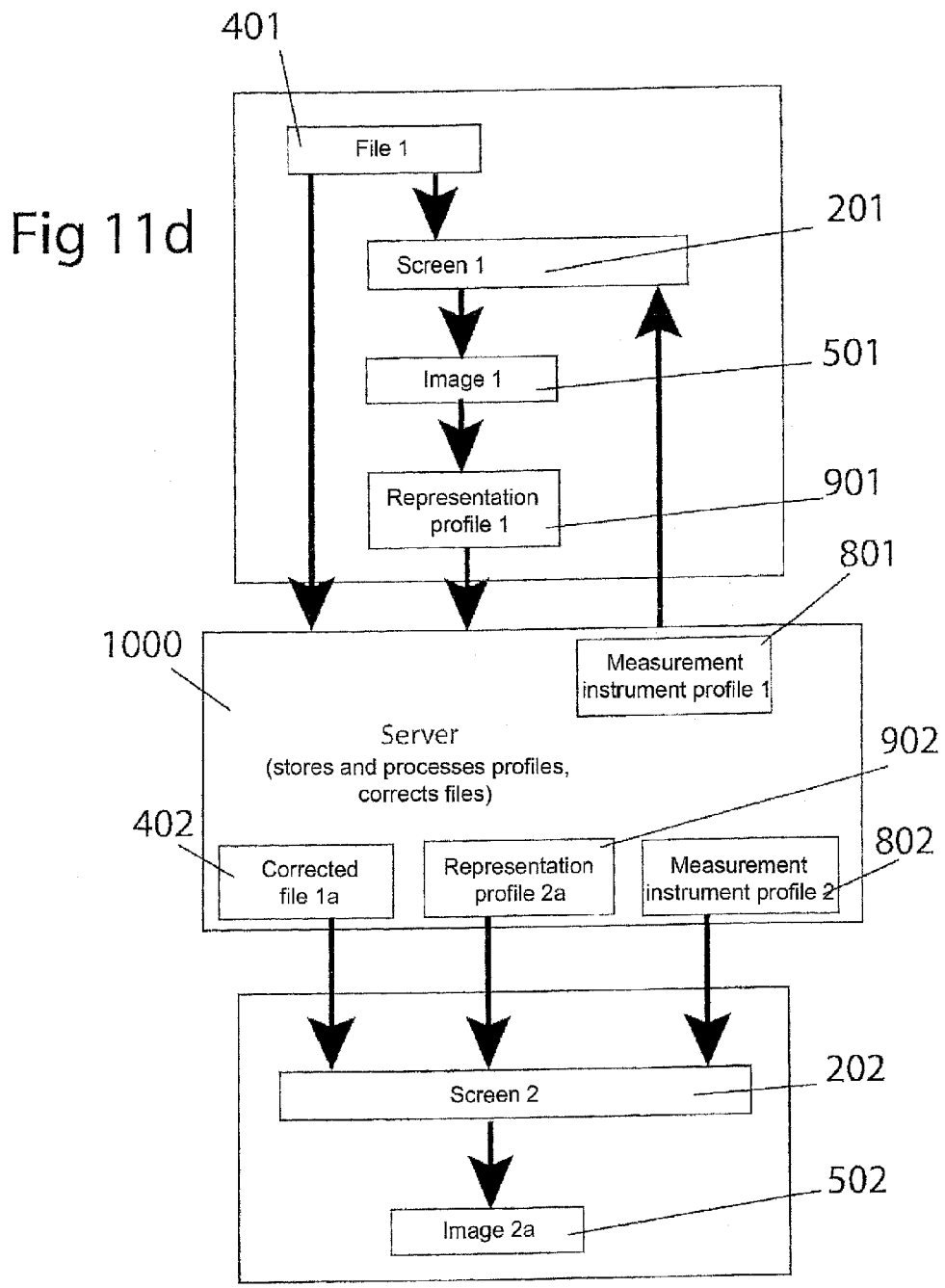

DEVICE AND METHOD FOR THE REPRESENTATION OF BODY COLOURS

The invention relates to a device for displaying surface colors, through which, in particular, print results can be simulated, and to a method, through which the surface colors can be displayed identically at different locations and at different times.

Surface colors are colors which are tied to surfaces, e.g. print ink on a sheet of paper or the textile dye in a cloth. Surface colors absorb spectral components from the white light spectrum. The color tone sensed by the eye of the viewer is comprised of the non absorbed spectral components, which are either reflected (opaque body) or transmitted (transparent body). This reflection and/or transmission require the illumination of the surface, without which the color tones of the surface colors cannot be perceived. The color tone of the surface color is influenced by the light tone. A white surface color, e.g. the white sheet of paper, or a white cloth, can only be displayed through illumination with white light. The color mixing with surface colors is subtractive. When surface colors are mixed amongst each other, each particular surface color subtracts its spectral component. Thus the spectrum of the mixed color has a narrower band than the spectra of the particular surface colors. In the extreme, the resulting spectrum is black. This means the entire white light spectrum is absorbed. The print industry uses the subtractive base colors cyan, magenta, yellow and black for four color printing (abbreviated CMYK, wherein C stands for cyan, M stands for magenta, Y stands for yellow, and B stands for black). Cyan is a blue-green color tone. This means the cyan spectrum includes blue and green components out of the white light. Magenta is comprised of red and blue spectral components, and yellow is comprised of red and green spectral components. When printing cyan and magenta on top of each other, cyan absorbs the red from magenta and magenta absorbs the green from cyan. The respective blue component is not absorbed. Thus, the resulting mix color is blue. Accordingly, printing cyan and yellow on top of each other, the mix color green is obtained, and through printing yellow and magenta on top of each other, the mix color red is obtained. The fourth base color black is used in order not to have to print the three colors magenta and yellow on top of each other, in order to obtain black, and since the mixing of these three colors in practical applications rather generates a dark brown, than a black color tone. The four color print cannot represent all colors. For printing on packaging material and for high quality print products, like e.g. high quality calendars and artistic prints, besides the basic print colors, cyan, magenta, yellow and black additionally so-called full tone colors are printed as additional colors. Print machines with up to twelve print units are customary, in which the products are printed with up to twelve print colors. The color tone of a full tone color typically cannot be mixed from the other print colors that are being used. The additional full tone colors increase the color space as a sum of all color tones that can be mixed from the base colors, which are being used. Full tone colors often are also designated as special colors or decorative colors.

Self-illuminating colors of screens, not requiring illumination, in order to represent a color tone, are fundamentally different from surface colors. Self-illuminating colors are generated e.g. through phosphorescence in the color pigments of the cathode ray tubes or plasma screens. All screens known according to the state of the art use the additive color mixing, wherein the color white is formed through adding the three additive base colors red, green, and blue (abbreviated RGB) by projecting them on top of each other, or in the form of small sub-pixels next to each other. In total, the red, green, and blue spectrum adds to the white total spectrum. The color black is displayed in the additional color mix through turning off the base colors. In practical applications, it depends on the surrounding light, the reflection properties, and the blackening of the diffusing screen of the monitor, if the target color black is perceived as black or gray-brown color tone. Colored ambient light changes the perceived color tone like in the subtractive color mix, also in additive color mixing. Due to the brilliance of the self-illuminating colors, the influence of the ambient light is less than in surface colors.

In practical applications, there are mixed forms of subtractive and additive color mixing. For example, during offset printing, particular colors are printed in the form of grid pattern pixels onto the print substrate. Color pixels printed on top of each other mix in a subtractive manner. Color pixels printed next to each other mix additively. All color pixels mix additively with the color tone of the non printed substrate. In LEDs, the self-illuminating additive base colors red, green, and blue are generated by white light from the background illumination falling through subtractive filters.

The print industry has the problem that identical print colors, when printed, can generate different color tones, due to a multitude of print parameters. The color deviation from the target value can thus be large enough, so that the customer does not accept the print, since the desired color effect was not achieved. In order to avoid that an expensive print run is relegated to scrap, due to wrong colors, the print run is simulated before. This simulation is called color proof or in short proof. When the proof has sufficient quality, the print run is released. Otherwise, corrections are made and possibly further proofs are performed. The perfect proof is the print on the batch print machine, on which also the print run is printed. Due to the cost, such a proof print is an exception. The second best proof solution is printing on a proof printing machine. This is a special print press, which is designed for single prints, and whose print properties correspond to the batch print machine to be used. For cost reasons, a proof on a proof print machine is only performed for high quality print products. All print colors can be printed on the batch print machine, as well as, on the proof print machine, including all full tone colors. The increasing digitalization in the print industry has lead to the development of digital proof solutions. In these solutions, the information to be printed will be sent as a digital print file to a raster image processor (RIP). The RIP can be provided as an independent computer, or it can run as software on a PC.

The RIP prepares the data, so that they can e.g. be printed on high quality ink jet printers or plotters. The RIP thus processes profile files of input and output devices, within a color management system. Customary profile files e.g. are the ICC-profiles, initiated by the International Color Consortium (ICC), which are generated according to predetermined rules for the equipment involved. In these ICC-profiles, it is stored, how the predetermined target colors are represented in real applications. With these profile files, the deviations in the color representation are compensated, which occur among the pieces of equipment that are being used in the process chain from the layout to the print. The RIP compensates all color deviations through the profiles, so that the proof print, e.g. on the plotter, simulates the print result well. A prerequisite for a good simulation is the use of the profile of the print machine, on which the print is performed eventually. Maintaining the parameters with which the profiles have been generated (e.g. the type of paper), and having all participating equipment calibrated like it was calibrated, when generating the profiles. Under these conditions, it is assured that the printer can print like it was simulated in the proof. Such proofs are designated contact proofs, since they are legally binding. Contact proof capable digital proof solutions are available from a plurality of vendors, e.g. Digital Chromalin from DuPont, Verisproofer from Creo-Scitex, software RIPs from EFI (best color proof RIP) and Global Graphics (Harlequin RIP) for controlling ink jet printers and plotters from Epson, HP, and Canon. Most digital proof solutions operate with the colors cyan, magenta, yellow, black, hell-cyan, and hell-magenta. The last two colors differ from cyan and magenta only through their saturation. They serve to represent the pastel colors in a more exact manner. Technically speaking, these are four-color printers. They can reproduce all colors, which can be printed with a four-color offset print press, since they have a larger color volume than a four-color offset print press. A much larger color volume, than with the four-color offset print is accomplished with the Pantone Hexochrome method. It also comprises several full tone colors of the widely used color systems HKS, RAL, and Pantone. In case of Hexochrome, the six colors cyan, magenta, yellow, black, green, and orange are used for printing. A few digital proof solutions, e.g. the HiFi Jet Plotters by MAN Roland, use the hexochrome method. All Hexochrome digital proof solutions can reproduce the color volume of the Hexochrome print on an offset print machine, but they cannot reproduce a multitude of full tone colors.

The digital proof solutions described before, allow so-called half-tone proofs. This means, they simulate exclusively the color tones (half-tones), but not the grid pattern and the grid pattern point of the offset print. For this purpose, there are specialized solutions, simulating the grid pattern point, in addition to the half-tone. Exact grid pattern point proofs are put out on the print plate exposition machines, on which also the print plates for later batch print are created. Such machines are offered e.g. by Creo-Scitex (Trendsetter Spectrum and Lotem spectrum). Simpler solutions simulate the grid pattern point of the print plate exposition machine with software (for example, Screen Proof by EFI or PixelProof by GMG Color), and print accordingly gridded data on high quality ink jet printers and plotters (e.g. made by Epson, Canon, and HP). The grid pattern pixel proofs are typically generated through the original print data of the RIP in 1-bit format. This means, for each color proof, a 1-bit file is available, listing, where a grid pattern pixel is printed in this particular color or not.

All digital proof solutions have in common that they cannot reproduce fluorescence, lacquer, and metallic colors. With reference to the print substrates, they can only consider the influence of paper colors and paper surfaces upon the color effect. The color effect of other print substrates, like e.g. cloth, metal, glass, plastic, or wood, cannot be simulated, or can only be simulated in an insufficient manner.

All proof solutions described above use a printout. This printout costs at least the time of the print proof and the consumable material in paper and inks. Courier expenses and courier times for proofs have to be added, which have to be produced on high quality digital proof solutions at external service providers. In order to save time, the so-called soft proof is used in many locations. This is a proof on a high quality (calibrated) screen. An advantage of the soft proof solution relative to the printout based proof solutions is speed. The proof is available immediately. The designer immediately has a first impression of the subsequent print result. The RGB color volume of the screens, which comprises colors, which cannot be printed with a four-color offset print press, in particular, the intense red, green, and blue tones, is a disadvantage. In addition, the RGB color volume cannot reproduce some printable color tones of a four-color offset print press, in particular, cyan and yellow tones. All full tone colors, fluorescence, lacquer and metallic colors, cannot be reproduced either on state of the art screens. In practical applications, the soft proof is only applied for non-critical color assessments. Critical colors so far always require the printout, either on a digital proof machine, or on a proof print machine. The current state of the art in the area of soft proof is that since 2003 LCD screens, which can be hardware calibrated, have a larger color volume, than the most high quality cathode array tubes. The units of the company Eizo (CG21, CG18, and CG19), Quato (Intelli Proof 21 and 19) and Barco (Coloris Calibrator) are available in this area. Said LCD screens cannot reproduce the intense cyan tones of four-color offset printing. The first screen to do this is the Eizo CG220, which has been available since fall of 2004. Screens with larger color volumes can be expected, starting in 2005, when a technology developed by Genoa Color Technologies becomes available, using four to six base colors (WO 01/95544 A2). Besides the three conventional base colors, red, green, and blue, cyan, magenta, and yellow are used as fourth through sixth base color. The cyan, magenta, and yellow components are calculated from the RGB input signal, and associated with the respective cyan, magenta, and yellow color channels. Screens with this technology will also be able to reproduce a number of full tone colors from the pantone-, HKS-, or RAL-color systems. These screens cannot reproduce many other full tone colors, fluorescent colors, lacquer colors, and metallic colors. Like all other screens of the state of the art, they can only consider the influence of paper colors and can consider the influence of paper surfaces on the color effect on a limited basis. The influence, which other print substrates, like e.g. cloth, metal, glass, plastic, or wood can have on the color tones, cannot be simulated.

All screens described above use the RGB color volume. Print files in the CMYK color volume, or in other color volumes with additional full tone colors have to be recomputed into the RGB color volume for the soft proof. This typically occurs within a color management system, like e.g. color sync by Apple Computer, which can use (ICC) color profiles from units that are involved. In order to keep the re-computation errors low, the re-computation typically is performed through a device independent color volume, like e.g. CIE Lab, and using the profile files. A screen is proposed by Genoa Color Technologies, in which the spectral features of the base colors used imitate the spectra of the print colors (WO 02/50763 A1 for screens with more than three base colors, and WO 03/058587 A2 for RGB screens with respective additive color mixing). Compared to the RGB screens and the RGB CMY screens, according to WO 01/95544 A2, these screens have the theoretical advantage that the color volume-re-computation with its errors can be dispensed with. It is being said that this is sufficient, when the spectral features of the base colors correspond to the spectral features of the print colors to be simulated. In practical applications, this applies exclusively for the color tones of the base colors. Due to the brilliance increase of additively mixed mix colors, there is a deviation from the subtractive mix colors in print, which leads to a brilliance reduction. As a consequence, brilliance compensations have to be calculated for the mix colors, which also lead to color deviations.

None of the screens can simulate the grid pattern pixel of the offset print, since the resolution is too low. A solution by Genoa Color Technologies is known, which has not been offered in the market so far (WO 030107745 A1) to zoom the cutouts of the print file, so that the grid pattern pixel of the print machine can be displayed enlarged with the raster of the screen. It is a disadvantage of this solution, that the grid pattern pixel is not shown in original size, but many times enlarged, whereby only a cutout of the file to be printed can be displayed. Furthermore, the grid pattern angles of the print cannot be simulated, whereby some artistic print products cannot be simulated on the screen.

All previously described soft proof solutions with (calibrated screens) and cost effective digital proof solutions (software-RIP and ink jet printers) allow so-called remote proofing, in which the proof is not performed in the print shop or in the preprint stage operation any more, in which the print plates are exposed, but remotely at the agency, or at the customer. Increasingly, there are solutions, e.g. eproof by Cyansoft and Virtual Proof by Kodak Polychrome Graphics, allowing the database based processing of files centrally stored on a server, by several persons simultaneously, and simultaneously allowing soft proofs when using calibrated screens. Virtual proof includes color management software and a color measurement device, through which the used screens (e.g. Eizo CG 21) are calibrated at least once every day, and which communicates to the server, if the screen is currently suitable for soft proof or not. If not, proof relevant functions are blocked.

It is a disadvantage of all remote proof solutions that the displayed colors of a file are different on different screens, even of identical construction, or the printout of a file is different on various proof systems in spite of the calibration of the screens. The color deviations between two identical units are very often not visible in practical applications. Reasons for these color deviations are e.g.:
  Different calibrations due to different calibration samples;
  Different measurement devices used in the calibration;
  Tolerances in identical measuring devices used in the calibration;
  Deviations of the ambient light;
  Deviations in the color representation due to screens set at different brightness levels (partially due to the ambient light), or light boxes set at different brightness levels, in which the proof prints are judged;
  Tolerances of the screens, with respect to the color tones of the base colors, due to slightly different filters, different lamp spectra, and aging effects;
  Deviations in temperature and air humidity, which leads to a changed color deposition in the proof printer print outs; and
  Tolerances of the proof printers with reference to the printout due to slightly different inks and papers and aging effects.

The particular process stages in the workflow from the design of the print product in an agency to the production of the print plates in the preprint stage and the printing in the print shop, including the contract proof, accepted by the customer before the print, are impeded through these color deviations, since they would have to be considered. This cannot be performed in real applications, since the particular deviations from a target representation are not known. As a substitute, the contract proof accepted by the customer is used as a reference. The contract proof is a printout accepted by the customer on a proof printer, or on a proof print machine, which typically includes additional color surfaces at the rim, which are measured through spectral photometry. For example, the UGRA/FOGRA media wedge CMYK V 2.0 is typical, which includes 46 color fields. Based on the deviations of the printed colors of the color fields from the target values, it can be determined, if the proof lies within the desired tolerance or not. Since the DRUPA 2004, solutions are being offered, e.g. by GMG Color, in which the measurement results of the spectral photometric measurement of the test surfaces are printed out on the label, and subsequently glued onto the proof print. Through this label, the customer receives a document, through which it can be checked, if the subsequent printout reproduces the colors within the desired tolerances or not. All soft proof solutions offered so far do not allow the contract proof, since no screen display can be reproduced so far in a legally binding manner.

It is the object of the present invention to provide a device in the form of a screen system for reproducing surface colors, through which in particular the colors of a print, which is produced on a batch printing machine, can be simulated (color proofing), and to provide a device by which identical surface colors can be displayed on various screen systems, in particular at different locations in an identical and reproducible manner at any given point in time.

On the device side, this object is accomplished through the teachings of claim 1. In a method for color proofing of surface colors, this object is accomplished through the teachings of claim 20.

The device according to the invention for color proofing of surface colors allows for the testing of the color effect of surface colors, in particular of print colors on a piece of paper through displaying the colors with a novel screen system.

This screen system according to the invention is subsequently briefly called screen, and includes at least one of the subsequent solution features:
  at least one white light source is used;
  base colors are generated with subtractive color filters from the white light;
  the base colors are formed from surface colors;
  depending on the design of the screen, one to any number of base colors can be used;
  the base colors can be selected;
  the base colors can be present on any substrate;
  mixed tones are mixed from the base colors through subtractive filtering;
  the sequence of the base colors for mixing mixed colors can be varied;
  the color mix is performed through subtraction for each dot;
  the color tones of the particular dots are projected onto a surface.

The invention provides different embodiments, in which the (print) file to be simulated is projected as an image, either from behind, or from the front, onto the projection surface of the screen. When the image is projected from behind (rear projection), the projection surface is a black colored diffusing screen, like in the state of the art. Dots, which are not illuminated from behind appear black in this embodiment, whereby the color black can be represented, which cannot be projected. The color white is represented in this embodiment by projecting the white light of the lamp(s) onto the diffusing screen unfiltered. A possible coloration of the paper to be imprinted is simulated in this embodiment by coloring the white light according to the color tint. This can e.g. be performed through independent color filters before the base color filters, or through a respective control of the base colors in all dots.

When provided as front projection, the color white is generated by projecting the white light of the lamp(s) onto a white surface. Preferably, this white surface is identical with the paper to be imprinted, in order not to have to simulate a potential tint of the paper. A particularly advantageous embodiment provides that the user can exchange the projection surface.

In the front projection, the ambient light prevents the representation of the color black. Therefore, the device according to the invention is preferably provided so that the ambient light is absorbed. This can e.g. be performed through suitable polarization filters in a λ/4 assembly, in which only appropriately polarized light of the lamps is reflected by the polarization surface, so that it passes the polarization filters. Dots, which are not illuminated by the lamp(s), thus do not reflect ambient light, and appear black.

The device according to the invention generates the base colors from white light through filters from surface colors. These surface colors can be transmissive glass filters or filter foils. These filters operate in a subtractive manner. It is a disadvantage of the transmissive filters that the reflection properties of the print colors on the paper can often only be simulated in an insufficient manner through respective controlling of the base colors. Hereby, deviations of the screen color from the color which is printed later exist. Particularly preferred embodiments of the invention thus provide for reflective color filters, which are e.g. produced from printed colors on white paper. In this embodiment of the device according to the invention, the reflective properties of the print colors are inherent components of the color filters and therefore do not have to be simulated.

Mixed colors are generated according to the invention through superimposing the base colors (color filters). This color mix is subtractive like in the print product. The color mix thus generated has less brilliance on the projection surface, than the unmixed base colors, like the color dot, which is printed from two or more base colors on top of each other, is less brilliant than the color dot, which is printed only from one base color. In a particularly preferred embodiment with reflective color filters produced from print colors on white paper, the mixed tones are identical with the ones of the subsequent print product. In contrast to the invention all state of the art screens additively mix the colors, whereby the mix colors are more brilliant than the base colors. The reduction of the color brilliance occurring in the print product therefore has to be compensated through reducing the color intensity of the base colors, which is only possible in an insufficient manner. In practical applications, this leads to color deviations between the color tone on the screen and the color tone on the print product.

Opposed to the state of the art, the user can select the base colors according to the invention. In particular, he can select full tone colors as base colors, with which the printing shall be performed later. Hereby, the user can check all color tones of full tone colors before the printout on the batch print machine through a representation with the device. The user can select the sequence of the color filters in a particularly advantageous embodiment. In particular, the sequence can be selected in the same manner, as the colors are printed onto print substrate one after the other. Hereby, also the mixed tones are represented, as they are printed later. This is not possible with state of the art screens, and it is not even possible with printout based digital proof systems.

Additional embodiments provide that the color temperature of the lamp(s) used is 5000 K, the standard light in the print industry, or that the color temperature is 6500 K, the standard light of image processing. Particularly preferred embodiments of the invention allow the selection of the color temperature through the user.

The color tones of fluorescent colors can be tested with embodiments of the invention, which use lamp(s), or which send out UV light components, or which use an additional UV light lamp. Through the state of the art, fluorescent colors can only be proved with printouts. They can neither be represented on screen proof systems, nor on printout based digital proof systems.

Metallic and lacquer colors, which differ from conventional colors through additional luster, so far can only be proofed with proof prints. The luster effect is created through directed reflection at the smooth surface with directed lighting. The luster of lacquer colors can therefore only be observed at a certain angle. In diffused lighting it can be observed under many angles.

In metallic colors, the metal particles are very often not all located in a plane, so that the directed reflection on single metal particles averaged over many metal particles obtains a diffused character. Hereby, the luster of metallic colors becomes observable, even under directed illumination at several angles. Particularly preferred embodiments of the invention provide directing additional light from other angles onto the reflective color filters with metallic colors or lacquer colors, whereby the projected color obtains a luster component. Under certain appropriate angles, the luster component corresponds to the luster increase of the printed color on the paper, whereby also these special colors can be checked with the screen according to the invention. Simpler embodiments according to the invention increase the lighting intensity in lacquer and metallic colors, so that the luster increase is included in the reflected light.

The device according to the invention is tailored in particular to the requirements of the print industry. For other applications, e.g. in the textile industry, in furniture construction, or in industrial design, it is also suited in particular. In particular, the embodiments with frontal projection, which allow the exchange of the projection surface, allow, through a suitable choice of the projection surface and the preferably reflective color filters and respective color temperature, the simulation of the color effect of textile prints, of furniture lacquering, or of industrial products. In these applications, preferably full tone colors are being used, which cannot be represented through screens and printout based digital proof systems. It is a particular advantage of the invention that not only the color tone of the projection surface, but also the reflection properties of the projection surface, e.g. wood, metal, plastic, cloth, class with smooth, rough, or structured surface, are hereby an inherent component of the simulation, what is not possible so far.

In these applications, opposed to the print industry, there is often the problem of color metamerics, this means, the same color has different color effects, depending on the illumination. In particular, during illumination with fluorescent tubes, or in case of light with a high UV light percentage this problem occurs. Particularly preferred embodiments of the invention provide, that additional light sources, e.g. with UV light percentage, can be selected by the user, in order to be able to detect metameric effects.

Special high resolution embodiments of the device also provide for the grid pattern dot proofing. Particularly advantageous embodiments of the invention for raster proofing allow the selection of the raster angle for each base color. In particular, the grid pattern angle can be set to the angular value, through which the print machine prints the respective base color. An additional embodiment for grid pattern dot proofing provides selecting the grid pattern dot size and/or the grid pattern dot shape and/or the kind of grid pattern and/or the resolution of the grid pattern according to properties of the offset print machine to be used in batch printing later on. These advantageous embodiments have a resolution, which allows simulating the grid pattern dot generation in the print plate exposition machine. In a print plate exposition machine, a particular grid pattern dot is generated within a matrix from 8×8 pixels through exposing particular pixels of this matrix.

The color mix of the described device is subtractive, this means, the color filters are located behind each other in the path of the beam. This functions with good results, when the used color filters (base colors) can be individually determined for each particular pixel or a small group of pixels, since otherwise only very dark color tones can be reproduced with more than two color filters. The subtractive color mix through individual sequential placement of the color filters can be simultaneously provided for all dots, or sequentially for a respective single dot. Certainly, also a solution is possible according to the invention, wherein several, but not all pixels are simultaneously controlled and projected. In embodiments with sequential or partially sequential projection, the fact is advantageously used that in a sufficiently quick change between various image contents, the particular image contents cannot be registered separately by the human brain any more. A mean of many image contents is registered. Devices for grid pattern dot proofing have a much higher resolution, so that a group of pixels has to be projected sequentially herein.

Preferably; the grid pattern dots are built from a matrix of pixels for grid pattern dot proofing, wherein said matrix corresponds to the matrix in the print plate exposition unit, e.g. 8×8 pixels.

The advantageous pixel wise control can e.g. be provided, so that white (standard) light is radiated by a lamp onto a digital mirror device (DMD). The DMD is comprised of many very small mirrors, which can e.g. be tilted by 10° or 12°. Depending on the control of a pixel (mirror), the light is directed onto a first color filter, or passed on unfiltered. Behind the color filter, all partial beams of all pixels are subsequently run together, and passed on in parallel to the next DMD, which in turn deflects the partial beams per pixel, so that they are directed through a second color filter, or remain unfiltered. For each base color, this process of placing the color filters in series is repeated. DMDs switch e.g. at 1000 Hz, in order to modulate the brightness of this pixel, is through the time percentage of a mirror position. Particularly advantageous embodiments according to the invention provide that in addition to a DMD, an additional DMD is used per base color, preferably, in a separate brightness module and after the last base color, wherein said DMD preferably modulates the brightness of the eventually mixed color tones preferably for all pixels. The modulation is performed, so that the partial beams are directed according to the brightness value in a time adapted manner, either onto a black absorber surface or into the polarization lens assembly.

Alternative embodiments of the invention provide that instead of DMDs, liquid crystals on silicon (LCOS) chips are used for pixel wise influencing of the light beams. LCOS chips modulate the light intensity pixel wise from 0% to 100% pass-through by rotating the LC molecules. Embodiments of the invention with LCOS chips mix the colors pixel wise subtractive through suitable routing of the light beams.

It is understood that besides DMDs and LCOS also other components (special light modulators) can be used according to the invention, when they allow to direct the light of the lamp(s) to a filter pixel wise, or in pixel groups, or not at all. The deflection of the light beams according to the invention can also be performed sequential. Within the scope of the invention there are also embodiments controlling several pixels but not all pixels simultaneously. Embodiments are also provided grouping exclusively, or selectively several pixels into a pixel group and controlling this pixel group.

The device according to the invention uses n base colors, wherein n can theoretically be any number. In practical applications, n will assume values from 1 to 12, this means, print files with one to twelve print colors are simulated, which are subsequently printed as one color print, or multicolor print with up to twelve print colors on respective print machines. Advantageous embodiments provide that the color filters for the base color generation can be automatically selected from a magazine. Particularly advantageous embodiments provide that additional color filters can be inserted, e.g. a piece of cloth or a lacquered piece of wood.

Advantageous embodiments of the invention provide that the ambient light is measured and the color tone of the ambient light on the projection surface is compensated through respective controlling of the lamp(s) and/or the base colors. Hereby, it is assured that the set color temperature is not distorted by tinted ambient light. Particularly advantageous embodiments of the invention provide to identify ambient light color tints, which cannot be compensated, and which require changing the ambient light. The identification can e.g. be performed through an optical display. Alternatively, or additionally information can also be provided, that the ambient light does not distort the colors of the projected image.

Advantageous embodiments of the invention provide that the colors of the base colors can be measured any time, and compared with the target values of the base colors with a measuring instrument, preferably a spectral photometer. Correctable deviations, e.g. through changing the color temperature of the lamp(s) are then corrected. When there are deviations, which cannot be corrected, when a color filter is bleached out, particularly advantageous embodiments of the invention provide to designate the base colors (color filters) as incorrect, and requesting the replacement. The identification can e.g. be performed through a red LED. Alternatively and/or additionally also a designation, e.g. with a green LED can be performed, so that the base colors of the color filters correspond to the target values, and/or the colors of the color filters are identical with projected colors.

Advantageous embodiments of the invention calibrate themselves automatically and/or manually with the measured values according to the predetermined target values.

Furthermore it is provided that a light box is integrated into the screen of the device, in order to be able to compare the projected image with a printout visually, or through measurement techniques. Preferably the printout is illuminated in the light box with the same light, which is used for projecting the image. A comparison through measurement techniques is performed preferably with the integrated measurement instrument, in particular with the spectral photometer.

The device according to the invention cannot be controlled with a conventional graphic card, which puts out an RGB signal, like with the state of the art equipment. Embodiments according to the invention use their own signal control, which again has to be provided in different versions. The control circuits transpose the input signal in the first step from its color volume into a color volume that is neutral with respect to the type of equipment, preferably CIELAB, and subsequently convert the signal into the color volume, which is created with the base colors used through subtractive color mixing. This is the color volume of the print machine which is used for printing later on. Light color tones, which are created in offset printing through mixing with the white of the paper, are represented either through brightness modulations, or in the embodiments for grid pattern dot proofing through pixels of corresponding size.

A special control allows the brightness modulation for each of the one to n base colors, which are used to proof a print file on the screen. The brightness modulation is thus preferably performed for each pixel by itself, but it can also be performed in pixel groups. The resolution of the brightness modulation is at least 8 bit, preferably 10 to 14 bit per base color. Controlling a screen in which the brightness modulation is performed for the pixels to be projected before or after subtractive color mixing is also within the scope of the invention. Advantageous embodiments of the invention provide for a control, in which the data to be checked are processed in a color separated manner. This means, for each base color there is a (partial) file, which only includes the information, which pixel is to be controlled in this color with what brightness. The color separation into the particular color sets is either performed by the control itself, or before, when generating the data to be proofed. Preferably, the color separation is performed through the RIP, with which the print plate exposition machine is also controlled subsequently. Particularly preferred embodiments of the control can also perform a under color addition (UCA) preferably for each pixel and/or an under color removal (UCR) and/or a gray component replacement (GCR). This means, an addition of colors (intensity increase) in particular of cyan, magenta, and yellow in the neutral and dark areas of an image (UCA), or the reduction of color intensity, in particular of cyan, magenta, and yellow in the neutral color ranges through the replacement with the color black (UCR), or through the replacement of color intensity also in the saturated color ranges through the color black (GCR).

Particularly preferred embodiments of the control according to the invention for the device for grid pattern proofing use the 1-bit files, through which the print plates are exposed. The 8 to 14 bit brightness modulation in the half tone proof is replaced here through a local modulation of the grid pattern dots, which are printed later. This means, the determination, if a grid pattern dot is displayed (later printed) or not. Particularly preferred embodiments for grid pattern dot proofing have such a high resolution that the dot shape of the print plate exposition machine, by which the print plates are created later, can be reproduced identically. Hereby, it is possible to simulate all dot shapes (elliptical round, round-square, elongated, square), grid pattern types (amplitude modulated, frequency modulated, random grid patterns, line grid patterns) grid pattern angles and grid pattern periods of the print plate exposure machine on the screen according to the invention. Preferably, the dot formation is performed the same way, as in the print plate exposition machine, in which within a grid pattern loop from a pixel matrix of e.g. 16×16 pixels a group of pixels is exposed into a grid pattern dot. Particularly preferred embodiments for grid pattern proofing also consider the dot increase of the print machine by considering respective print characteristic lines. Particularly preferred embodiments of the invention use a control, which can process PDF files, in particular in PDF-X/3 format, and job tickets, in particular in job definition format (PDF-JDF). Job tickets constitute post processing information for the particular file.

Besides the coloring proofing of print files, or the simulation of the color effect of other imprinted, lacquered or dyed materials, than paper, preferred embodiments of the invention can also reproduce (moved) RGB signals like conventional screens according to the state of the art. To the contrary, the RGB signal is processed in the control system, so that it can be represented through subtractive color mixing.

The control system according to the invention can be provided preferably in hardware and/or in software. Advantageous hardware embodiments use free programmable chips, e.g. field programmable gate arrays (FPGA) or fast digital signal processors (DSPs), or graphic processors with the capability to control more than three color channels. The graphic processors can be positioned on a graphic card, or they can be a component of a CPU (central processing unit). The DSPs or the FPGAs can also be components of a CPU. In software embodiments, the software can be an independent program, or part of an application software (e.g. a layout program), or of an operating system software.

The device according to the invention achieves the object of identical representation of surface colors, in particular of colors which are printed with a batch printing machine on a screen system. The simplest embodiment of the method according to the invention is comprised of a device for representing surface colors with subtractive color mixing and a special control for the subtractive color mixing screen. The control transposes arriving data, in particular the data of a print file, so that the colors represented on the subtractive color mixing screen are identical with the body colors, which are being printed later.

Representing body colors with subtractive color mixing is better than with all known devices and devices for color proofing. Due to tolerances in the color filters for base color generation, the color of the projection surface, of the ambient light, the color temperature, and of the measuring equipment used, there are small deviations, when the same print file is displayed on different devices according to the invention. These deviations in the color representation can then be removed, when several screens are being used next to each other. In this case, the display of a screen serves as a reference, to which the other screens are calibrated with the same measuring instrument, so that the representations are identical. In the digital workflow it has to be possible to display the print file at various locations in an identical manner. Advantageous embodiments of the method according to the invention therefore provide that a screen representation in the workflow is declared a reference and all other screen images reproduce this reference display. For this purpose it is mandatory that the calibration is performed with the same measuring instrument or that the measurement instruments which are being used measure identically. Since the identical measurement instrument cannot be used at different locations and different measurement instruments have limited measurement precisions, the device according to the invention provides to compensate for the errors of the measurement instruments. For this purpose, the deviations of each measurement instrument used from a reference measurement instrument are stored in an individual profile file. The control system compensates for the measurement errors through the profile file of the measurement instrument used in the reference display and the profile file of the measurement instrument for the screen to be controlled. Due to this measurement error compensation subsequently the color tone of the projection surface, the base color color-filters, the color temperature and the ambient light can be measured and adjusted, like in the reference representation in the workflow. The reference representation is hereby identically reproduced at another location. This is not possible according to the state of the art.

The profile files of the measurement instruments involved are sent according to this method within the workflow with the print file and the (ICC) profiles to the workstations involved, where they are processed in the respective control systems.

Another embodiment of the method provides that the measurement error compensation is not performed on site at the workstations in the workflow, but at a central location outside of the conventional workflow. This location can e.g. be a server of the manufacturer of the subtractive color mixing screen. When the participants in the workflow need or wish the identical display of a reference representation they have to perform the measurement error compensation in this embodiment according to the invention for each display through a central location.

Another embodiment of the invention provides to store additional data of the representation at a central location, like e.g. color filters used for the base colors, type and color tone of the projection surface, color temperature, ambient light, utilized screen, and utilized control system. With these data it can be assured in addition to the measurement error compensation, that a reference representation can be reproduced at another location in the workflow. It also can thus be assured that said reference representation has been reproduced. Together with the print file and a media wedge, these additional data allow a contract proof. For the contract proof, the representation is documented on a subtractive color mixing screen, when the customer agrees to the representation of the print file on a screen in the workflow, and documents this at the central location. This documentation can e.g. be a digital signature, preferably all contract proof relevant data, like e.g. the digital signature of the customer, parameters of the image representation, and the print file are stored in a contract proof file at the central location, and thus protected from further writing accesses. If somebody in the workflow then needs the contract proof, e.g. the printer, in order to correctly set up the print machine, he receives a measurement error compensated copy, this means, the contract proof is reproduced on a subtractive color mixing screen. Advantageous embodiments encode the measurement error compensations and/or the parameter data of the screen representation and/or the print file and/or the contract proof data in order to avoid falsifications. Instead of the potentially large print file alternatively also a value representing them, e.g. a cryptographically secured hash value, can be stored.

In all the above method variants, the print colors on the screen according to the invention are only then set exactly the way they are printed later on, when the color filters for the base colors can represent the print colors and the projection surface has the color of the print substrate. This is assured in the simplest manner, when the color filters for the base colors are reflective filters, which are made from the print substrates, which are imprinted with the print colors, and when the projection surface is the print substrate. Also, in other embodiments, possible deviations in the print colors compared to the printed colors can be simply removed by calibrating the reference screen with the printed colors before. In the simplest manner, this exact matching of the screen display with the printed colors is performed in the respective print shop. Preferably a color critical workflow then looks as follows: The designers operate with the base colors, which are identical with the colors that are printed later, besides the print machine typical parameters. When the designers have decided for certain print colors (e.g. CMYK plus full tone colors), the print shop produces a reference representation for the desired print colors, which was calibrated with the printed colors. The designers then reproduce this reference representation and show it to the customer. If the customer agrees, this representation becomes the contract proof, which all subsequent participants in the workflow reproduce. In particular, the print press operator sets his print machine according to the contract proof.

Figure 5:
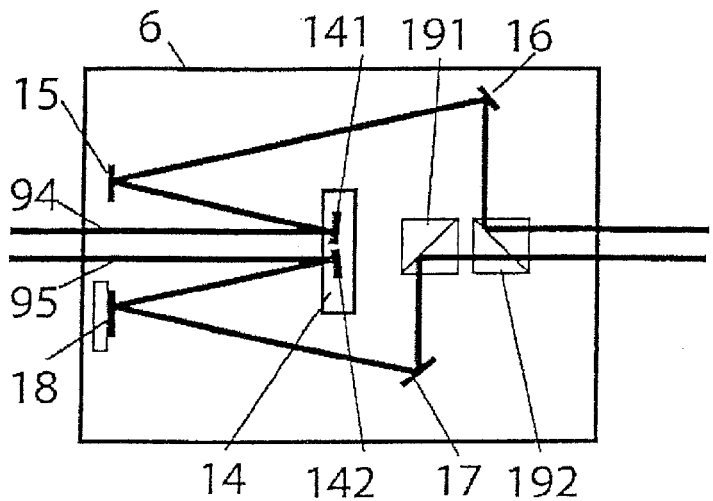
Figure 6:
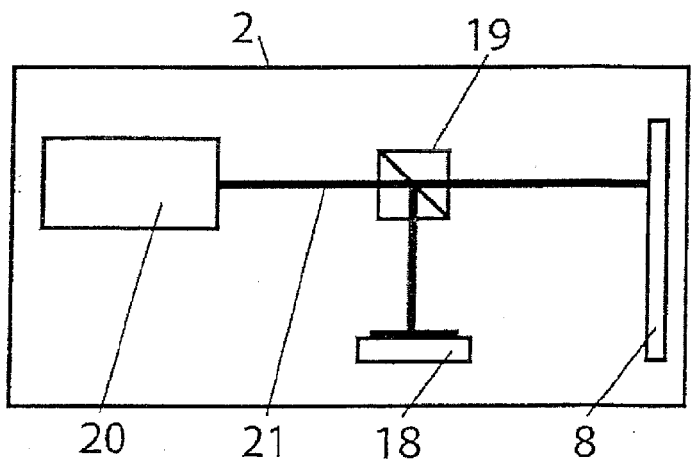
Figure 7:
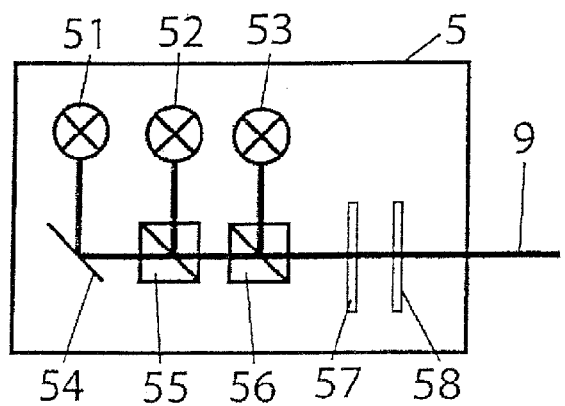
Figure 8:
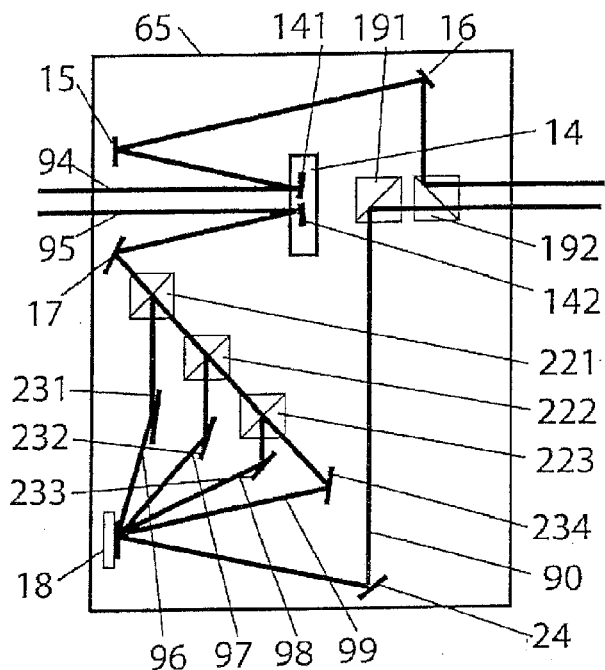
Figure 9:
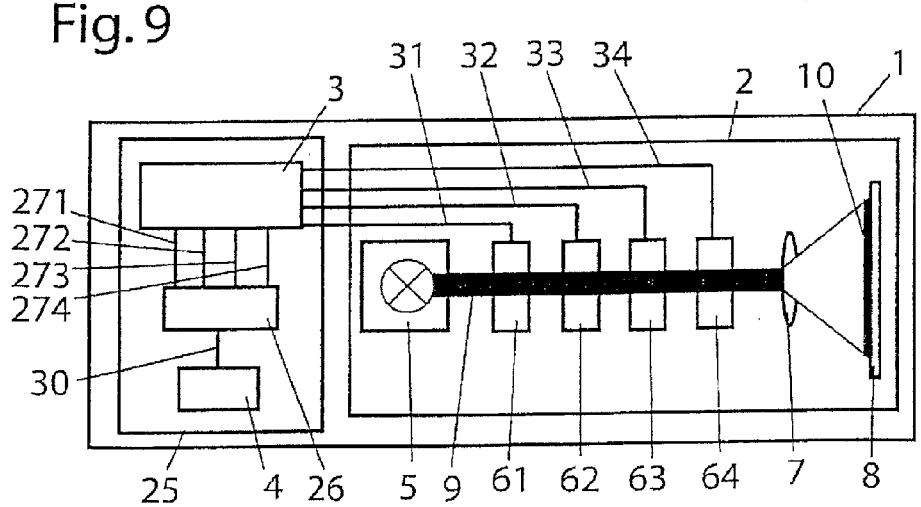

The invention is described in more detail with reference to embodiments and figures. It is shown in:

FIG. 1 schematically the main components of the invention with the data path up to the image;

FIGS. 2A through 2D schematically the subtractive color mixing with two base colors;

FIGS. 3A through 3D schematically the position of rotating color filters, in order to represent the colors of FIGS. 2A through 2D with a DMD;

FIGS. 4A through 4D schematically the positions of rotating prisms in order to represent the colors of the FIGS. 2A through 2D with a LCOS chip each per base color;

FIG. 5 schematically a color module with a DMD;

FIG. 6 schematically an embodiment with a spectral photometer;

FIG. 7 schematically a lamp module with several lamps;

FIG. 8 schematically a color module for metallic and lacquer colors with a DMD;

FIG. 9 schematically the main components of the invention in which the control is integrated into a PC, with the data path up to the image;

FIG. 10 schematically the most important steps in the method according to the invention as flow chart from the file to be printed to the simulation of the print in the image;

FIG. 11a through FIG. 11e schematically the method steps to the contract proof with the device according to the invention as tree diagrams.

Figure 12:
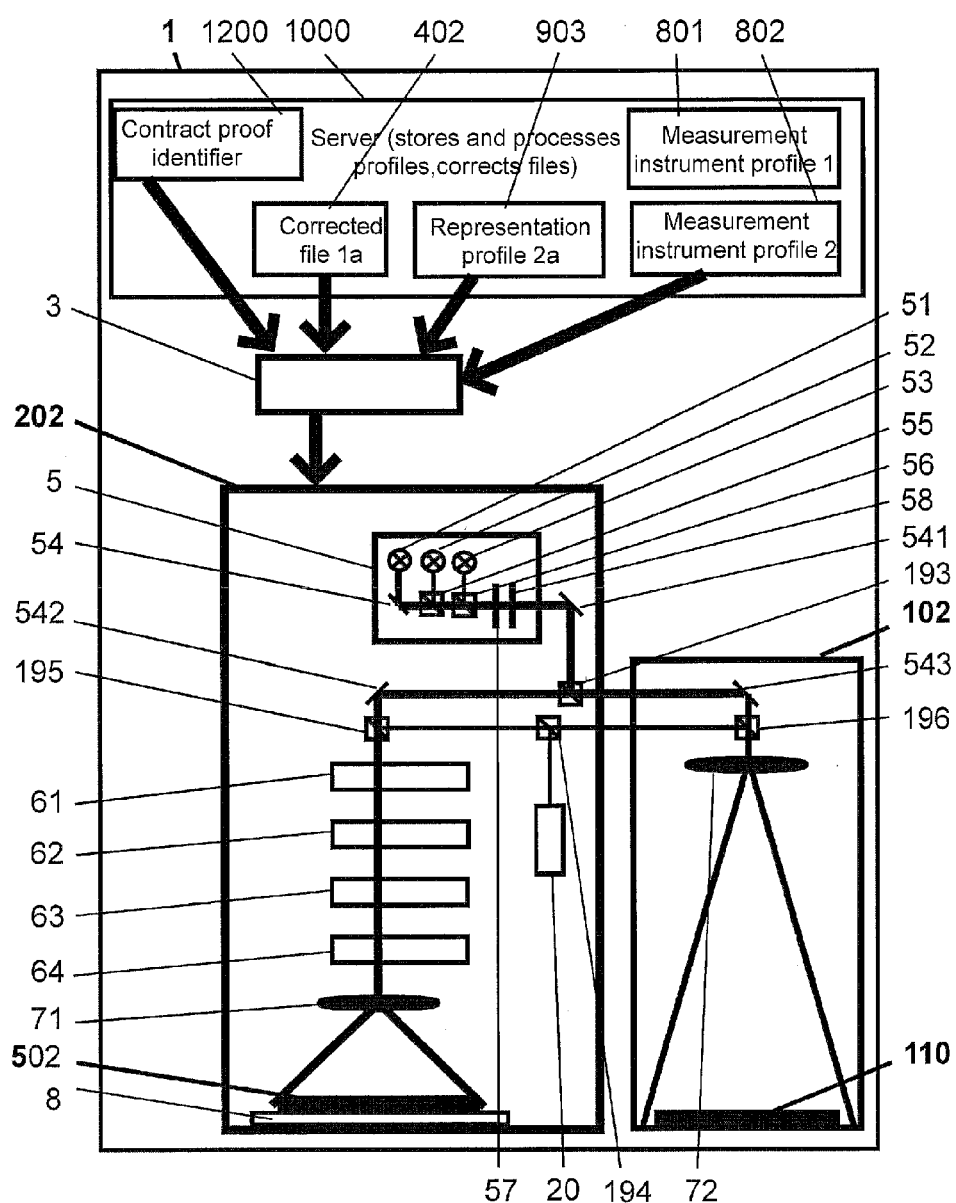

FIG. 12 schematically a preferred embodiment for press machine adjustment with the device according to the invention combined with a light box and part of the invented contract proof method.

FIG. 1 schematically shows the main components of the invention 1, which substantially are comprised of the screen with subtractive coloring mixing 2 and a control for the subtractive color mixing 3. The main components of the screen 2 are a lamp module 5, four color modules 61, 62, 63, and 64 for one base color each, a projection lens assembly 7, and a projection surface 8. The color modules allow the subtractive color mixing through their construction and arrangement behind each other in the screen. Each color module can let the incoming light pass pixel wise, or unfiltered, or filtered. Each color module generates a base color from white light. The filtered light from the first color module is mixed in the second color module 62 subtractive as a first base color with the base color of said second color module by passing pixel wise through the filter of this color module. Subsequently the light is directed through the color modules 63 and 64, where it is again mixed pixel wise respectively. The light beam 9 from the lamp module 5, which is conducted through the color modules, is projected with the projection lens assembly 7 onto the projection surface 8, where the image 10 is generated. In order to generate this image, the control 3 processes the incoming data 30 of the file 4 to be displayed and passes controls signals 31, 32, 33, and 34 to the color modules 61, 62, 63, and 64. The control signals control the color modules pixel wise, so that the light 9 passes from the light module 5 pixel wise through the base color filters of the color modules or not. The brightness modulation is performed in this embodiment through the time percentage, by which the light is passed through the base color filters pixel wise. The image 10 is the visualization of the file 4, and in case of a corresponding color temperature and calibration of the screen the exact simulation (color proof) of the later printout on a print machine. In this example the screen can use up to four base colors. These can e.g. be the colors cyan, magenta, yellow and one full tone color. It is understood that the screen according to the invention can have less, but also more color modules. Preferably the color filters are white paper surfaces (not shown), which are imprinted with the print colors to be used subsequently. These color surfaces filter and reflect the light the same way as the colors on the imprinted paper later on. Simpler versions use transmissive filters instead of the reflective filters, these are preferably dichroitic.

Figure 2A:
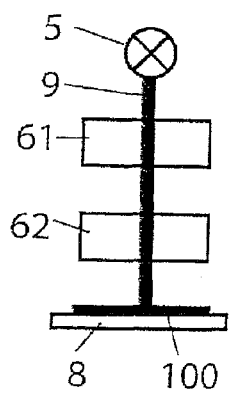
Figure 2B:
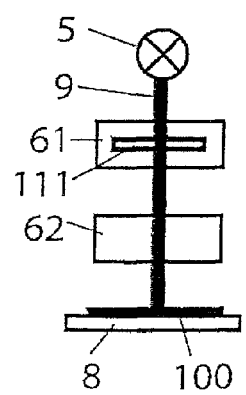
Figure 2C:
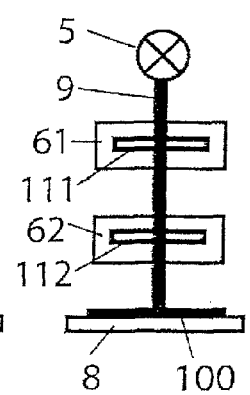
Figure 2D:
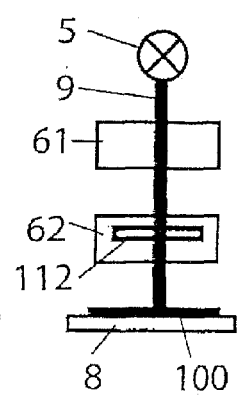

The figures FIG. 2a through FIG. 2d show schematically the subtractive color mixing with two color modules. The four possible subtractive color filtering operations are shown for a particular pixel. The light 9 form the lamp module 5 is first directed through the color module 61 and then through the color module 62 and then falls onto the white projection surface 8 where the image dot 10 is generated. In FIG. 2a the light 9 runs unfiltered through the color modules; the image dot 100 on the projection surface has the color white. In FIG. 2b the light in the color module 61 is filtered through the color filter 111. The filter 111 generates the first base color. This light subsequently passes unfiltered with the color tone "first base color" through the color module 62. The image pixel 100 on the projection surface has the color "first base color". In FIG. 2c the light 9 is filtered in both color modules. In the color module 6 with the color filter 111 and the color filter 112 with the color module 62. The image dot 100 on the projection surface is the subtractive mix color "first base color—second base color". In FIG. 2d the light 9 is directed unfiltered through the color module 61 and filtered through the color filter 112 in the color module 62. The image dot 100 on the projection surface 8 has the color "second base color". In practical applications, in addition to these four maximally saturated colors, color tones with different brightness will be generated through the time percentage of the color filtering.

Figure 3A:
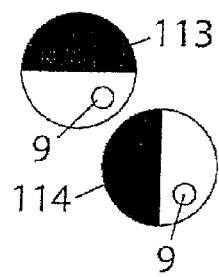
Figure 3B:
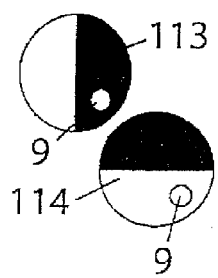
Figure 3C:
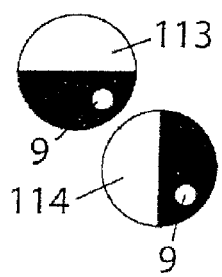
Figure 3D:
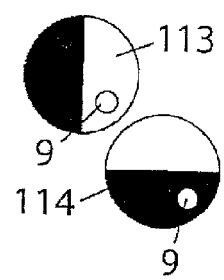

The FIGS. 3a through 3d schematically show the realization of the subtractive color mixing according to the FIGS. 2a through 2d with two subsequently arranged color filters 113 and 114, which are provided as rotating color wheels and which are positioned in front of a digital mirror device (not shown). The color wheels are colored on the one half with the color tone of the first base color (113), or the second base color (114) and they are uncolored in the other half. In FIG. 3a the initially white light beam 9 respectively falls through the uncolored part of the color wheels. The exiting light beam thus remains white. In FIG. 3b, the initially white light beam 9 falls through the colored part of the color filter 113. The color tone after the filter 113 is the first "base color". Subsequently the colored light is directed through the uncolored part of the color filter 114. The exiting light beam thus has the color "first base color" at the end. In FIG. 3c, the light beam 9 respectively falls through the colored halves of the color wheels 113 and 114. The exiting light beam has the subtractive mix color "first base color—second base color". In FIG. 3d the light of the light beam 9 falls through the uncolored half of the color filter 113 and subsequently through the colored half of the filter 114. The exiting light beam thus has the color "second base color". The subtractive color mixing in the FIGS. 3a through 3d is sequential. This means, synchronous to the positions of the color wheels the DMD, which is not shown, is controlled so that only the desired pixels pass the respective color on to the projection lens assembly. In practical applications, in addition to these four maximum saturated colors, color tones of different brightness will be generated through the time percentage of the color filtering.

Figure 4A:
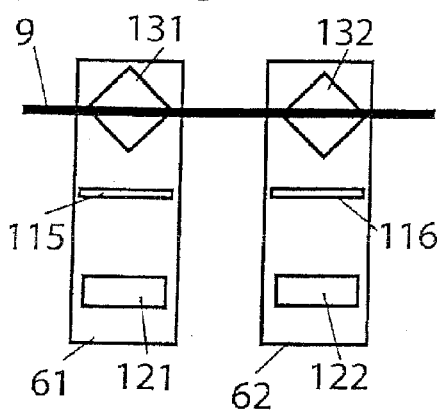
Figure 4B:
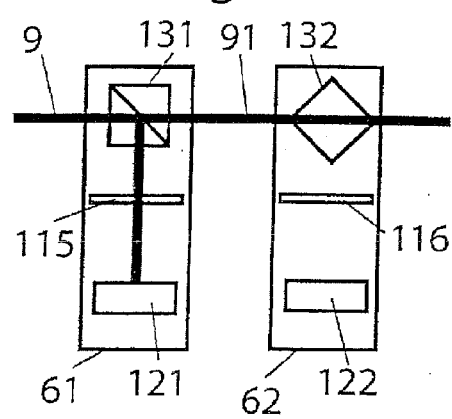
Figure 4C:
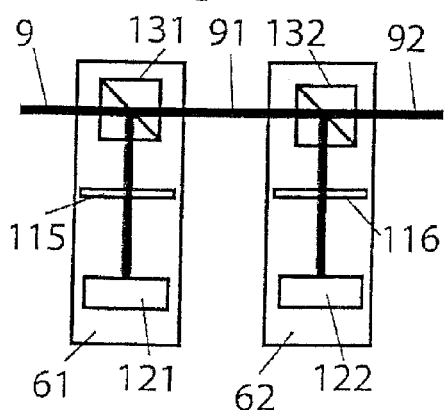
Figure 4D:
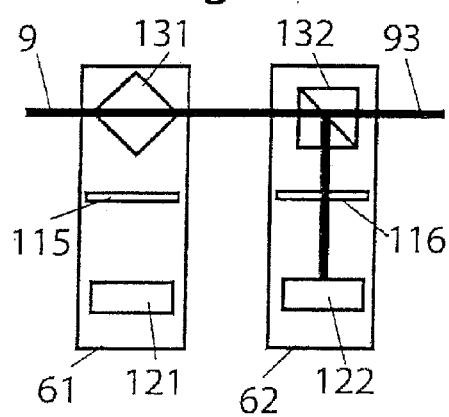

The FIGS. 4a through 4d schematically show the realization of the subtractive color mixing according to the FIGS. 2a through 2d with two color modules 61 and 62, which each have a respective rotating prism 131 or 132, and a respective LCOS chip 121 or 122 for pixel wise brightness modulation and a respective color filter 115 or 116. In FIG. 4a, the rotating prisms 131 and 132 are located in the color modules 61 and 62 so that the incoming white light beam 9 passes the color modules unfiltered. The resulting color is white. In FIG. 4b, the prism 131 in the first color module stands, so that the incoming light beam 9 is directed to the LCOS chip 121. On its path there, the light beam passes the color filter 115. The light beam 91 reflected by the LCOS chip and modulated pixel wise in brightness passes the color filter 115 again and is conducted to the outlet of the color module by the prism 131. The exiting light beam 91 has the color "first base color". The prism 132 in the second color module is positioned, so that the light beam is passed unrestricted. The resulting color is the "first base color". In FIG. 4c, the prisms 131, 132 stand in both color modules 61, 62, so that the light beam is respectively directed through the color filter 115, 116, and the brightness is modulated pixel wise respectively in the LCOS chip 121, 122. The first color module 61 converts the white light of the incoming light beam 9 into a colored light beam 91 with the color "first base color". This light is filtered again in the second color module 62. The exiting light beam has the color "first base color—second base color". In FIG. 4d the prisms 131, 132 are located in the color modules 61, 62, so that the incoming light beam 9 passes the first color module 61 unfiltered. The light is filtered by the color filter 116 in the second color module and modulated pixel wise in its brightness with the LCOS chip 122. The exiting light beam 93 has the color "second base color". The subtractive color mixing in the FIGS. 4a through 4d is sequential. This means, commensurate with the positions of the rotating prisms, the LCOS chips are controlled, so that only the desired pixels conduct the respective color to the projection lens assembly.

It is understood that also embodiments with any number of subsequently arranged color modules with color wheels or LCOS chips lie within the scope of the invention.

FIG. 5 schematically shows a color module 6 with a DMD 14. The incoming light beam 94 is deflected by the DMD pixel mirror 141, so that it leaves the color module unfiltered through the mirrors 15 and 16 and the prism 192. The incoming light beam 95 is deflected by the DMD pixel mirror 142, so that it falls onto the reflective color filter 18. The reflected light beam has the color of the filter (a base color of the screen) and leads the color module 6 through the mirror 17 and the prisms 191 and 192. The filter 18 is preferably an imprinted surface, which is made from the print substrate to be imprinted later (typically a paper) and the print ink to be used subsequently. Light color tones are generated through a time modulation of the DMD 14. Embodiments, in which the pixel wise brightness modulation is not performed in particular color modules, but through a special brightness module (not shown), also lie within the scope of the invention. This brightness module is disposed in front of the first color module or behind the last color module. This brightness module can e.g. be a color module with a LCOS chip (like in FIG. 4a through 4d, only without color filter), or with a DMD (like in FIG. 5, only instead of the color filter 18 a black absorber surface is disposed).

FIG. 6 schematically shows a screen 2 with integrated spectral photometer 20. The spectral photometer 20 with its measuring beam 21 either measures the color of the color filter 18 (reflective in this case), or the projected color on the projection surface 8. The switch over is performed through a rotating prism 19. For simplicity reasons additional components within the beam path (e.g. within the color module) were left out in FIG. 6.

FIG. 7 schematically shows a lamp module 5 with three light sources. The light source 51 is the standard light source, which does not emit a UV light component. It preferably emits standard light D50 with 5000 K color temperature. The light source 52 is a UV light source and the light source 53 is a fluorescent tube. In front of the outlet of the lamp module, an infrared protective filter 57 is located, and a color temperature filter 58, in order to switch the color temperature to D65 (6500 K). Typically, the exiting light beam is only generated by the light source 51, wherein the color temperature can preferably be adjusted through the control of the light source and/or through the color filter 58. The light from the light source 51 is directed through the mirror 54 to the output of the lamp module. For the lighting of the fluorescent colors, additionally the UV light source 52 is switched in through the prism 55. In order to be able to proof metameric effects with fluorescent tubes, the light from the fluorescent tube 53 is directed through the prism 56 to the lamp module output. This light can be emitted alone, or in combination with the light sources 51 and/or 52. For simplicity reasons, additional components in the beam path (e.g. for beam forming) were omitted in FIG. 7. Embodiments, in which the IR- and/or UV protection filter, or the filter for color temperature setting are located in front, or in the particular color modules, are also within the scope of the invention.

FIG. 8 shows a color module 65 for generating a glossy base color, in particular a lacquer color, or a metallic color with a DMD 14. The incoming light beam 94 is deflected by the DMD pixel mirror 141, so that it leaves the color module unfiltered through the mirrors 15 and 16 and the prism 192. The incoming light beam 95 is deflected by the DMD pixel mirror 142, so that it falls through the mirror 17 onto three beam splitter prisms 221, 222, 223, disposed in series. The resulting partial beams 96, 97, 98 and 99 are directed onto the reflective color filter through the mirrors 231, 232, 233, and 234. The reflected light beam 90 has the color of the filter (a base color of the screen) and leaves the color module 65 through the mirror 24 and prisms 191 and 192. Preferably the filter 18 is an imprinted surface, which is made from the print substrate to be imprinted later on (typically a paper), and from the print color to be used later. This color is a metallic or lacquer color. These colors show a gloss increase due to the metal particles, or due to the smooth lacquer surface. Through the partial beams impacting at different angles this increase in gloss of these colors is also reflected in the outgoing light beam 90. Bright color tones are generated through a time modulation of the DMD 40, or through a brightness module, which is not shown.

FIG. 9 schematically shows the main components of the invention 1 with a control system 3 integrated into a computer 25, and with an integrated RIP 26. The screen with subtractive color mixing 2 has a lamp module 5 as a main component, four color modules 61, 62, 63, 64 for one respective base color each, a projection lens assembly 7, and a projection surface 8. The light beam 9 from the lamp module 5, conducted through the color modules, is projected through the projection lens array 7 onto the projection surface 8, where the image 10 is generated. In order to generate this image, the control 3 system processes the incoming color separated data 241, 242, 243, and 244 from a RIP 26 from the file (4) to be represented, and passes control signals 31, 32, 33 and 34 on to the color modules 61, 62, 63, and 64. The control signals control the color modules pixel wise, so that the light 9 from the lamp module 5 falls through the base color filters of the color modules pixel wise, or not. The image 10 is the visualization of the file 4, and in case of an appropriate color temperature and calibration of the screen the exact simulation (color proof) of the subsequent printout on a print machine. In embodiments for halftone proofing either the control 3 calculates the required brightness modulation from the RIP data 241, 242, 243, and 244 for each projected pixel, or the RIP delivers this information. The brightness modulation is performed in the embodiment for halftone testing through the time percentage, by which the light is directed pixel wise through the base color filter. In embodiments for grid pattern tone proofing no brightness modulation is required, since it is controlled through the size of the grid pattern dots. In these embodiments, the control system preferably processes the 1-bit data of the RIP, through which the print plates are exposed later. In FIG. 9 the data generation 4, the RIP 26 and the control system 3 are realized in a computer 25. The control system 3 can thereby be provided as software or hardware. In a hardware embodiment, it can be integrated in the central processing unit (CPU), or in the graphics processor (GPU) or it can be integrated through a proper processor (e.g. on a plug in card). The RIP 26 can be realized in software, or in hardware on a plug in card. Embodiments also fall within the scope of the invention, in which the control system and/or the RIP are housed in the housing of the screen 2 or respectively in a separate housing. Also, embodiments fall within the scope of the invention, in which the projection unit and the projection surface are not integrated in a housing. In the example of FIG. 9 the screen can use up to four base colors. These can e.g. be the colors cyan, magenta, yellow and a full tone color, but these can also be only full tone colors. It is understood that the screen according to the invention can have less, or also more color modules. Preferably the color filters are white paper surfaces, (not shown) imprinted with the print colors to be used later. These color surfaces filter the reflected light, like later on the colors on the imprinted paper.

FIG. 1 and FIG. 9 show devices according to the invention. Simultaneously they represent a simple embodiment of the device according to the invention. The device according to the invention in its simples embodiment is the simulation of surface colors in particular of print colors of a print with a screen, generating the mix colors through subtractive color mixing. FIG. 10 schematically shows the most important steps of the device according to the invention as a flow diagram. A (print) file 4 is sent to a control system 3. This control system for subtractive color mixing screens transposes the print file into control signals for color modules and controls the particular color modules 6 of the subtractive color mixing print screen, so that the image 10 is created. The image 10 in case of correct calibration, correctly selected base colors and maintenance of standard values, is an exact simulation of the printed file on the screen. Not marked are partial steps like e.g. the processing of (ICC-) profile files and measuring the colors.

Figure 11B:
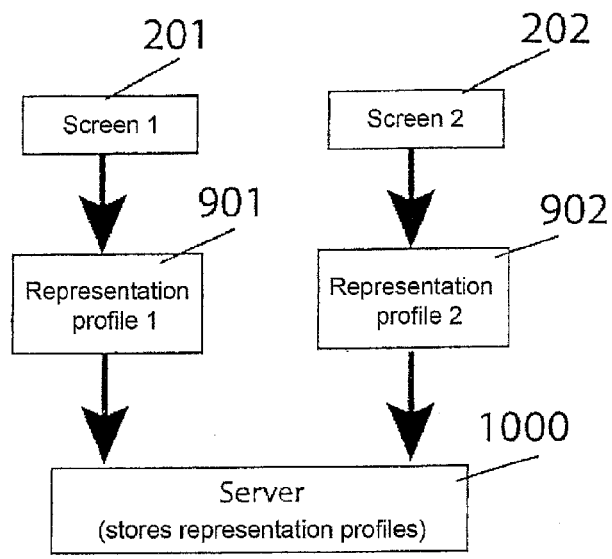

FIGS. 11a through 11e show important process steps of advantageous embodiments of the method according to the invention schematically as tree diagrams. An advantageous embodiment allows the identical reproduction of a file on various screens according to the invention by eliminating the tolerances of the measurement instruments involved. FIG. 11a shows, which process steps eliminate the tolerances of the measurement instruments involved. With a high quality reference measuring instrument 700 (e.g. the spectral photometer GretagMacbeth ColorEye 7000A with a maximum error of 0.08 ΔE) reference samples are being measured 710. The simpler measurement instruments 701 and 702 (e.g. the spectral photometer GretagMacbeth EyeOne with a maximum measurement error of 1.0 ΔE), which are integrated into two screen systems according to the invention, measure the same samples under identical measurement conditions 711, 712. The measurement results 721, 722, 720 are obtained. The measurement results of the reference measuring instrument 720 are compared with the measurement results 721 and 722, 731 and 732. The deviations are documented in the measurement instrument profiles 801, 802, which are stored on a server 1000. The measurement equipment profiles are the basis for compensating the tolerances of the measurement instruments. Through the measurement instrument profile the deviation of the measurement value from the exact value is corrected. This means the measurement is then as exact, as with the reference measurement instrument.

Figure 11C:
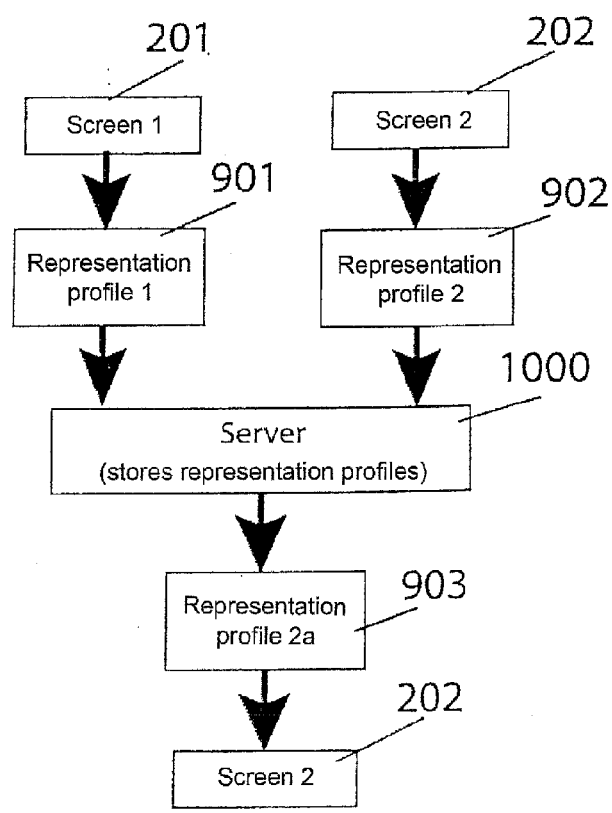

FIG. 11b schematically shows in a tree diagram, like for the two screens 201, 202, the representation parameters in representation profiles 901, 902, combined and stored on a server 1000. In the representation profiles preferably all or part of the parameters can be stored, which are required for representing an image, e.g. type and intensity of the light source, which color filters are being used for the base colors, type and color tone of the projection surface, color temperature, surrounding light, gamma value, brightness. For an exact reproduction of an image on another screen it is required that the representation parameters of the second screen 202 correspond to the ones on the first screen 201. They do not all have to be identical. E.g. when the ambient light is different, said difference has to be compensated through other parameters. FIG. 11c shows an advantageous embodiment according to the invention, in which this compensation is computed by a server 1000, and a new representation profile 903 is sent to the second screen 203.

Through these corrected representation parameters the image on the screen 202 is almost identical with the image on the screen 201. Deviations are only caused by the tolerances of the measurement instruments, through which the colors are measured on both screens. FIG. 11d schematically shows device steps of an advantageous embodiment of the method according to the invention, in which representation profiles and measurement profiles are used in order to exactly to reproduce an image on another screen. A file 402 is shown on the first screen 201 as a first image 501. The representation of the image 501 is performed with the measurement instrument profile 801, received from the server 1000. The file 401, as well as the representation profile 901, is sent to the server. The server calculates a corrected representation profile 903 from the representation profile 901 and 902, which represents together with the associated measurement instruments profiles 802 the file 401, or a corrected file 402 on the second screen 202 as second image 502. The image 502 is identical with the image 501. The file 401 rarely has to be corrected in order to be identically reproduced on another screen, e.g. when a color temperature adjustment is not possible with screen internal filters. Then the color temperature setting is performed through the file 402.

Figure 11E:
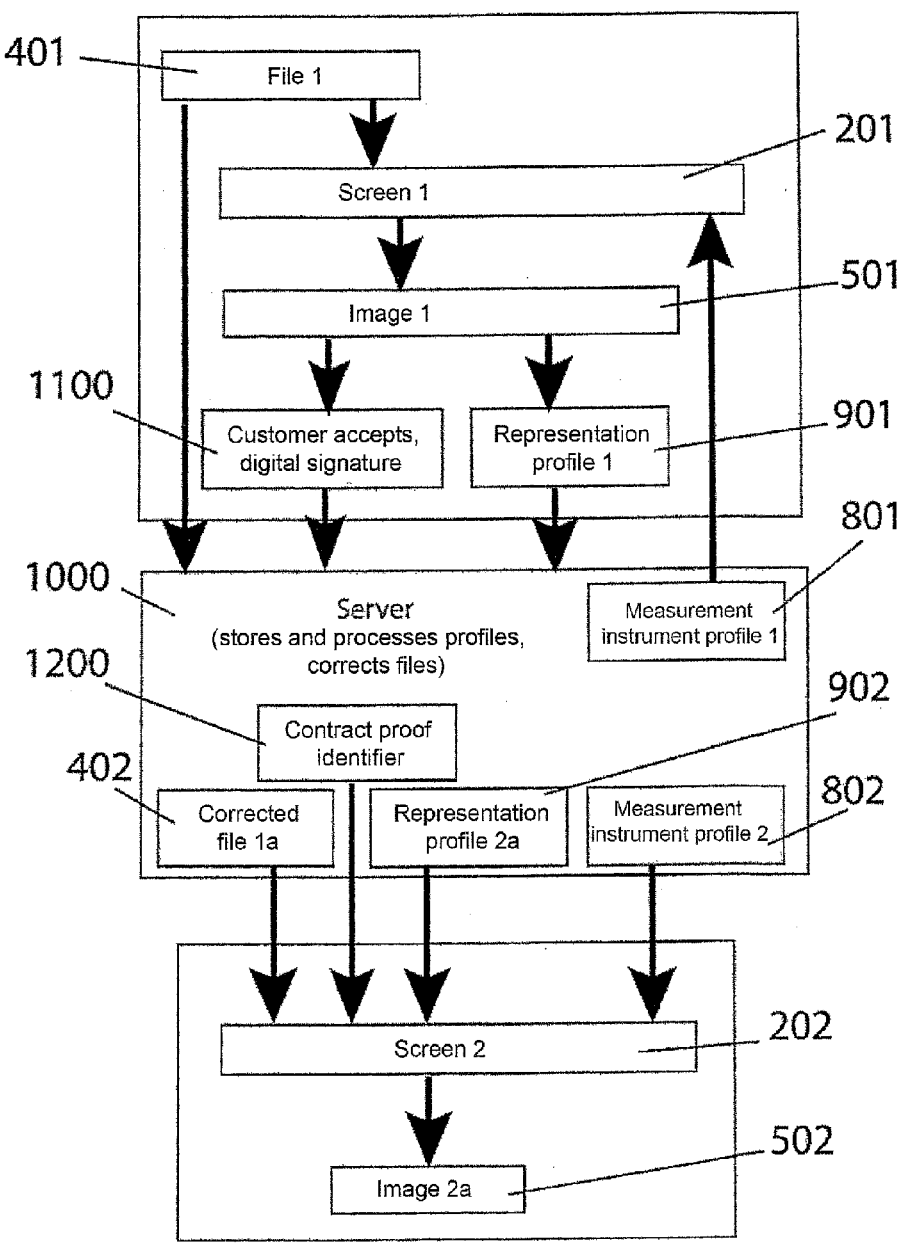

FIG. 11e shows the expansion of the method according to the invention to the contract proof method. The file 401 is represented on the first screen 201 as a first image 501 with the measurement instrument profile 801, which is received from the server 1000. This representation is the simulation (proof) of the subsequent print. The customer sees the image 501 and accepts it as proof. He documents it e.g. with his digital signature 1100. This signature 1100, the file 401, and the representation profile 901 are preferably transmitted to the server in encrypted form, where they are stored. When the proof is required in another location, in order to reproduce it on a second screen 202, the server at this screen 202 sends the associated measurement instrument profile 802, the respective representation profile 903, and the file 401, or a corrected file 402 and a contract proof identifier 1200. In the contract proof device all data remain stored on the server, which are required for the first display of the contract proof on the first screen, and for all other reproductions of these first contract proof representations, required on other screens. They are only deleted, when the customer of the print product orders the deletion. In case of an argument, when the print does not look like the contract proof representation on the screen, it can be traced based on the proof representations stored on the server, where in the workflow the error has occurred, and who has to pay for the damages.

FIG. 12 shows an embodiment of a screen according to the invention, where the screen is combined with a light box and where this embodiment is part of the invented contract proof method. The invention 1 comprises of the main components: server 1000, a control for the subtractive color mixing 3, a screen 202 and a light box 102. The server 1000 stores and processes the following data as shown in FIG. 11e: The file 1, which is the file to be printed, the representation profile 901 from screen 201, which contains all data to reproduce the image 501 on screen 202. The server combines the measurement profile 1 801 and the measurement profile 2 802 (to compensate the deviation between the two measurement devices) with the representation profile 1 901 and with the file 1 to calculate a corrected file 1a 402, and a representation profile 903. This representation profile 903 contains all data to reproduce the image 501 from first screen 201 (see FIG. 11e), approved by the customer with the contract proof identifier 1200, onto the second screen 202. The server sends the following data to the control for the subtractive color mixing 3: The contract proof identifier 1200, the corrected file 1a, the representation profile 903 and the measurement profile 2 802. The control for the subtractive color mixing 3 processes these data to drive the (pixelwise) subtractive color mixing with the base colors. The data flow according to this subtractive color mixing is not shown in FIG. 12. Shown is in FIG. 12 the light path from the lamp module 5 through the screen 202 to the front-projected image 10 onto the print substrate 8, and the light path from the lamp module 5 to the printout 110 into the light box 102. The lamp module 5 is similar to the lamp module shown in FIG. 7 and contains three light sources. The light source 51 is the standard light source, which does not emit a UV light component. It preferably emits standard light D50 with 5000 K color temperature. The light source 52 is a UV light source and the light source 53 is a fluorescent tube. In front of the outlet of the lamp module, an infrared protective filter 57 is located, and a color temperature filter 58, in order to switch the color temperature to D65 (6500 K). Typically, the light beam is only generated by the light source 51, wherein the color temperature can preferably be adjusted through the control of the light source and/or through the color filter 58. The light from the light source 51 is directed through the mirror 54 to the output of the lamp module. For the lighting of the fluorescent colors, additionally the UV light source 52 is switched in through the prism 55. In order to be able to proof metameric effects with fluorescent tubes, the light from the fluorescent tube 53 is directed through the prism 56 to the lamp module output. This light can be emitted alone, or in combination with the light sources 51 and/or 52. The light from the lamp module is directed via the mirror 541 and the rotating prism 193 either to the screen 202 or to the light box 102. If the light is directed to the screen 202, the light passes a mirror 542 and (pixelwise) four color modules 61, 62, 63 and 64, and a projection lens 71 to reproduce the image 501 (see FIG. 11e) as image 2a 502 onto the print substrate 8 via front projection. If the light is directed to the light box 102, the light passes the mirror 543 the projection lens 72 and illuminates the printout 110 from the press machine. To control the adjustment of the press machine the measurement beam of the color spectrometer 20 can be directed via the rotating prisms 194 and 195 either to the print substrate 8 in the second screen 202 or via the rotating prisms 194 and 196 to the printout 110 in the light box 102. If the press machine is correct adjusted according to the contract proof image 501, reproduced identically as image 502 onto screen 202, the colors of the image 502 and of the printout 110 are identical or the deviations are acceptable (e.g. are smaller than the allowable maximum deviation according to the customer).

For simplicity reasons, additional components in the beam path (e.g. for beam forming) were omitted. Embodiments, in which the IR- and/or UV protection filter, or the filter for color temperature setting are located in front, or in the particular color modules, are also within the scope of the invention. Also within the scope of the invention are embodiments with protection from ambient light with polarizing filters in lambda/4-assembly.

Devices combining any device feature and/or method steps from the single embodiments, described above, also fall within the scope of the invention.

What is claimed is:

1. A device for representing surface colors for simulating print results through a screen, comprising at least one light source and a projection surface, wherein the base colors are generated from white light through filters from surface colors and the mixed colors are generated through subtractive color mixing, preferably through reflexive color filters,
    wherein the base colors are formed through reflection of preferably white light on color surfaces, in particular on print substrates imprinted with print colors, wherein mixed colors are generated from the base colors of the image through subtractive color mixing or the surface colors are created through transmissive filter glasses, or filter foils,
    wherein mixed colors are formed from the base colors through subtractive color mixing,
    wherein the image is projected onto a preferably black colored glass or plastic surface from behind or
    wherein the image is projected from the front onto a preferably white projection surface, and
    wherein the subtractive color mixing is preferably performed for each pixel by itself, or in pixel groups, in particular in lines.

2. A device according to claim 1, wherein the reflexive color filters are comprised of a typical paper, provided with the respective print color.

3. A device according to claim 1, wherein the projection surface can be replaced.

4. A device according to claim 1, wherein the projection surface is made from a smooth, rough, or structured paper, metal, wood, plastic, glass or textile material.

5. A device according to claim 1, wherein the ambient light is filtered in particular through polarization filters disposed in front of the projection surface in a $\lambda/4$ assembly.

6. A device according to claim 1, wherein the light sources and their intensity can be selected, wherein the color temperature of the light, through which the base colors are generated, can be adjusted.

7. A device according to claim 1, wherein a measurement device, in particular a spectral photometer is provided, through which the colors of the projected pixels and/or the colors of the color filters are measured for base color generation, wherein the measurement data of the measurement instrument are being used for automatically and/or manually calibrating the screen and/or adjusting the color temperature and/or keeping the color tones of the base colors constant and/or confirming the compliance with the predetermined parameters and/or warning of deviations from the predetermined parameters.

8. A device according to claim 1, wherein a light box is provided, wherein the printout in the light box is illuminated with same light, through which the base colors are formed, and/or that the colors of the printout of the light box are measured with the same measurement instrument, in particular the same spectral photometer, through which the colors of the projected images and/or the color filters of the base color generation are determined.

9. A device according to claim 1, wherein the light from the light source is separated into partial beams and these partial beams are directed under different angles onto the reflective color filters, wherein these reflective color filters show a gloss increase due to the metal particles, or due to the smooth lacquer surface.

10. A device for representing surface colors for simulating print results through a screen, comprising at least one light source and a projection surface, wherein the base colors are generated from white light through filters from surface colors and the mixed colors are generated through subtractive color mixing, preferably through reflexive color filters, wherein the subtractive color mixing is preferably performed for each pixel by itself, or in pixel groups, in particular in lines.

11. A device according to claim 10, wherein the subtractive color mixing is performed simultaneously for all pixels, or pixel groups or simultaneously subsequently for all pixels or pixel groups.

12. A device according to claim 11, wherein the distance of the projected pixels or of the projected pixel groups is adjustable.

13. A device according to claim 12, wherein the distance of the projected pixel corresponds to the grid pattern width of a print plate exposition machine.

14. A device according to claim 11, wherein for each base color another angle of the projected pixels, or the projected pixel groups is adjustable, wherein preferably the angles for the projected pixels or pixel groups correspond to the grid pattern angles of offset printing machine.

15. A device according to claim 10, wherein the form of the projected pixel or of the projected pixel group can be adjusted through optical components, in particular through variable apertures.

16. A device according to claim 15, wherein the form of the projected pixel corresponds to a grid pattern dot of a print plate exposition machine.

17. A method for representing surface colors for simulating print results through a screen, comprising at least one light source and one projection surface, wherein the mixed colors are mixed from the base colors through subtractive color mixing, wherein at least part of the representation parameters of the projected image is stored in at least one representation profile.

18. A method according to claim 17, wherein the representation parameters of another, second screen are processed in particular from a representation profile of this second screen in order to reproduce its representation onto a first screen.

19. A method according to claim 17, wherein the representation parameters of a second screen, in particular its representation profile and the measurements of the measurement instrument used on or in the screen are processed with the measurement profile associated with this measurement instrument, so that the measurement deviations between this measurement instrument and the reference measurement instrument can be compensated and the representation of the other screen is reproduced.

20. A method according to claim 17, wherein the representation parameters of a second screen, in particular its representation profile, and the measurements of the measurement instruments used on and/or in the screen are processed with the measurement instrument profiles associated with these measurement instruments, so that the measurement deviations between this measurement instrument and the reference measurement instrument can be compensated and the representation of the other screen is reproduced.

21. A method according to claim 17, wherein a representation deemed to be good is provided with a unique identifier, in particular with a digital signature, wherein in a contract proof method a file is represented on a first screen as a first image with a measurement instrument profile, which is received from a server as a simulation (proof) of the subsequent print, wherein a customer sees the image and accepts it as proof, wherein this acceptance is documented by a digital signature of the customer, and wherein the signature, the file, and the representation profile are preferably transmitted to the server in encrypted form, where they are stored.

22. A method according to claim 21, wherein the representation profiles and measurement profiles and the acknowledge of the customer are stored preferably cryptographically secured onto a server, wherein from this server the first screen receives the data to reproduce the representation of second screen onto the first screen.

23. A method according to claim 21, wherein the representation profiles and measurement profiles and the acknowledge of the customer and the data to be printed and the data to be reproduced on the first screen are stored preferably cryptographically secured onto a server, wherein from this server the first screen receives all data to reproduce the representation of second screen onto the first screen.

24. A method according to claim 17, wherein at least one representation profile and/or at least one measurement instrument profile and/or at least one unique identifier, in particular a digital signature and/or the file is stored on a server and/or called up from the server for reproducing a representation of a screen on a second another screen.

25. A method according to claim 17, wherein the representation parameters of a second screen, in particular its representation profile, and the measurements of the measurement instruments used on and/or in the screen and used on and/or in the second screen are processed with the measurement instrument profiles associated with these measurement instruments, so that the measurement deviations between this measurement instruments and the reference measurement instrument can be compensated and the representation of the second screen is reproduced onto the first screen.

26. A method according to claim 17, wherein the representation onto the second screen deemed to be good by the customer and this acknowledge is stored in a file digital signature and this representation onto the second screen is reproduced on the first screen according to claim 1 through processing of the representation profiles and measurement profiles of the second and first screen.

27. A method for representing surface colors for simulating print results through a screen, comprising at least one light source and one projection surface, wherein the mixed colors are mixed from the base colors, wherein at least part of the representation parameters of the projected image is stored in at least one representation profile, wherein at least one measurement instrument, in particular a spectral photometer is used, whose measurement characteristics were determined with a reference instrument, and which is stored in at least one measurement instrument profile.

28. A method according to claim 27, wherein the measurements of the measurement instrument used on the screen and/or in the screen are processed with the measurement instrument profile belonging to this measurement instrument, so that measurement deviations between the measurement instrument and the reference measurement instrument can be compensated.

29. A method according to claim 28, wherein the measurement instrument profiles of two measurement instruments are processed, so that the respective measurement deviations between the measurement instruments and the reference measurement instrument can be compensated.

* * * * *